United States Patent [19]

Satoh et al.

[11] Patent Number: 4,535,439
[45] Date of Patent: Aug. 13, 1985

[54] OPTICAL HAVING INDEX MARK AND SECTOR MARK

[75] Inventors: Isao Satoh, Neyagawa; Tomio Yoshida, Katano; Shunji Ohara, Higashiosaka; Kenji Koishi, Hyogo, all of Japan

[73] Assignee: Matsushita Electric Industrial Co., Ltd., Osaka, Japan

[21] Appl. No.: 444,456

[22] Filed: Nov. 24, 1982

[30] Foreign Application Priority Data

Dec. 1, 1981 [JP] Japan .................................. 56-193970
Dec. 4, 1981 [JP] Japan .................................. 56-196044

[51] Int. Cl.³ .......................... G11B 7/24; G11B 17/22; G11B 7/00
[52] U.S. Cl. ...................................... 369/275; 369/32; 369/44
[58] Field of Search ...................... 369/275, 32, 43, 44; 358/342; 360/97

[56] References Cited

U.S. PATENT DOCUMENTS 4,245,247 1/1981 Fike et al. ............................ 358/342
4,321,635 3/1982 Tsuyuguchi ........................... 369/32
4,325,135 4/1982 Dil et al. ............................ 369/275 X

FOREIGN PATENT DOCUMENTS 0023767 2/1981 European Pat. Off. ............ 369/275
0054438 6/1982 European Pat. Off. ............ 369/275
2058434 4/1981 United Kingdom ................ 369/275

Primary Examiner—Aristotelis M. Psitos
Attorney, Agent, or Firm—Wenderoth, Lind & Ponack

[57] ABSTRACT

The disclosure is directed to an optical recording and reproducing disc in which each track circumference of guide tracks formed into a concentric or spiral configuration is divided into a plurality of sectors for selective recording and reproduction of information in any desired sectors. Sector separating zones of predetermined configuration are provided at starting portions of the respective sectors, while predetermined sector marks indicating the sector separating zones are formed on an index track provided at an outer or inner periphery of the disc in positions corresponding to the sector separating zones so that, during selection of the sectors at recording and reproduction, reproduction signals by the sector marks are used for selection of the sectors, while starting of the recording and reproduction is effected by the reproduced information of the sector separating zones.

4 Claims, 19 Drawing Figures

OPTICAL HAVING INDEX MARK AND SECTOR MARK

BACKGROUND OF THE INVENTION

The present invention relates to an optical recording and reproducing medium which is an information carrier in the form of a disc for optically recording and reproducing information by an optical information recording and reproducing apparatus and more particularly, to an optical recording and reproducing disc of a sector structure arranged to effect recording and reproduction of information by dividing guide tracks, preliminarily formed in groove-like configuration, into a plurality of information recording zones.

Conventionally, as one means for recording or reproducing signals, there has been employed an arrangement in which, with a disc formed by a photosensitive recording material being kept rotating, signals are recorded at a high density on said disc in the form of phase variation by concave-convex portions, formation of holes, or variations in light reflection factor, etc. through irradiation of light such as a laser beam or the like converged into a very small diameter of less than 1 $\mu m\phi$, onto said disc.

By way of example, a video disc of the optical type has been well known as a device for reproducing signals preliminarily recorded thereon at a high density through application of the technique as described above. Similarly, in an apparatus for preparing a prototype of a video disc, the above technique for recording signals is employed. Meanwhile, as the signals to be recorded, video signals, audio signals, digital signals, etc. may be considered.

In the optical recording and reproducing apparatus as referred to earlier, the recording of signals is effected by irradiation of a laser beam onto a thin recording film formed on the disc for fusing and evaporation at portions of said recording film subjected to the irradiation or for variation of reflectance and transmittance of said recording film. In other words, it is a common practice for this purpose to alter the optical characteristics of the recording material through utilization of energy of the laser beam in the form of heat.

On the other hand, by providing optically detectable guide tracks on the disc, an optical recording and reproducing disc having a high track density and strong against external vibrations may be achieved.

For one example of the guide tracks as described above, it has been proposed to employ a groove having a depth of approximately ⅛ wavelength of the light from a light source used for recording and reproduction, and a width in the range of 0.5 to 1.0 $\mu m$. The groove as described above is spirally or concentrically provided at a predetermined track pitch or interval, over the entire surface of the signal recording zone on the optical recording and reproducing disc.

In the guide tracks as described above, for making it possible to record and reproduce digital information at any desired positions, each of the tracks is preliminarily imparted with specific track address information, and divided into a plurality of information zones or sectors as units for recording or reproducing digital information. For separating the above sectors from each other, it is necessary to form sector separating zones.

In the sector separating zones as referred to above, coded sector numbers are recorded in one method, while special signals may be recorded in another method, but for selection of such sector separating zones, characteristics and information recording efficiency of the optical recording and reproducing disc must be taken into consideration.

Firstly, the sector separating zones are required to be positively detectable even when the optical recording and reproducing disc has flaws and faults. In the sector separating zones of the type in which sector numbers are formed into codes, it becomes necessary to provide an error correcting capacity for correcting errors which may be produced by the flaws and faults of the optical recording and reproducing disc as described above. On the contrary, to impart a powerful error correction capacity may result in disadvantages that data length for the sector separating zones is undesirably lengthened, with increased time required in the decoding for correction of errors. Moreover, there have been such problems that, since information can not be recorded into the sectors during decoding period for error correction of the sector separating zones, information recording efficiency of the disc is lowered as the data length of the sector separating zones is increased. Furthermore, there have also been such disadvantages that since the sector separating zones and track address zones formed by concave and convex pits have a larger reflection light amount than in the groove portions constituting the guide tracks, upon application of a light servo for focusing and tracking to the sector separating zones and track address zones, the light servo tends to be readily subjected to oscillation.

SUMMARY OF THE INVENTION

Accordingly, an essential object of the present invention is to provide as improved optical recording and reproducing disc which is capable of stably effecting sector detection and track address reproduction, even when flaws and faults are present in said optical recording and reproducing disc, and can simultaneously prevent unstability in the application of a tracking servo, due to overlapping of timing for turning on the tracking servo after high speed shifting of an optical pick-up, with the sector separating zones, during retrieval for the optical recording and reproducing disc.

Another important object of the present invention is to provide an optical recording and reproducing disc of the above described type which is stable in functioning at high reliability, and which can be readily manufactured on a large scale at low cost.

In accomplishing these and other objects, according to one preferred embodiment of the present invention, there is provided an optical recording and reproducing disc having guide tracks formed thereon for optically recording and reproducing information, which includes a plurality of track address recording zones, a data track section including sectors capable of recording a plurality of information and sector separating zones for separating said sectors from each other, and an index track section provided at an outer portion or inner portion of said data track section. The track address recording zones, data track section and index track section are provided on said guide tracks, while said index track section further includes index marks for indicating positions of said track address recording zones and sector marks for indicating positions of said sector separating zones.

More specifically, the optical recording and reproduction disc according to the present invention is characterized in that, there are provided a plurality of track addresses formed at specific portions of the guide tracks, the data track has a plurality of sectors separated by sector separating zones, and the index track which is arranged at an outer or inner peripheral portion of said data track has a plurality of index marks formed at positions corresponding to starting end portions of said track addresses and a plurality of sector marks formed in positions corresponding to starting end portions of said sector separating zones.

The sector separating zones have features in the construction thereof that they are not readily subjected to erroneous detection by flaws, faults, etc. of said disc, i.e. concave and convex phase construction thereof or concave and convex pit rows constituting said zones.

Moreover, the index marks and sector marks provided in the index track are formed by guide track pieces arranged in an arcuate configuration with respect to the center of said disc so as to be detectable without employment of a laser beam, and since the rotation starting position of said optical recording and reproduction disc and the positions of the track addresses and sector separating zones may be found thereby, such index marks and sector marks can be used for the still reproduction of the spiral guide tracks or for timing of turning on of a light servo system.

BRIEF DESCRIPTION OF THE DRAWINGS

These and other objects and features of the present invention will become apparent from the following description taken in conjunction with the preferred embodiment thereof with reference to the accompanying drawings, in which;

FIG. 5(c) is a diagram showing a waveform therefrom, FIGS. 6(a) and 6(b) respectively are a fragmentary top plan view and a sectional view of the optical recording and reproducing disc in FIG. 2, showing on an enlarged scale, the phase structure of the sector S and sector separating zone Sp of said disc.

DETAILED DESCRIPTION OF THE INVENTION

Before the description of the present invention proceeds, it is to be noted that like parts are designated by like reference numerals throughout the accompanying drawings.

Figure 1:
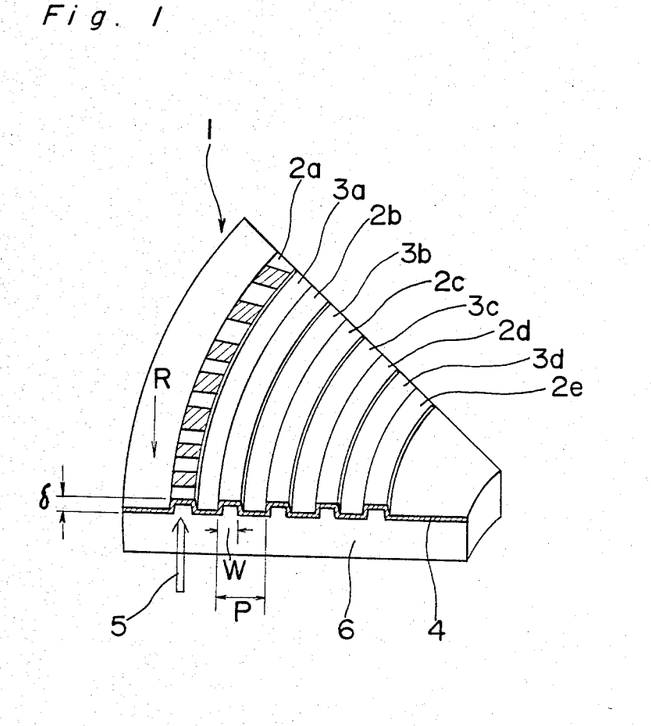
FIG. 1 is a fragmentary perspective view of an optical recording and reproducing disc to which the present invention may be applied, showing the structure of guide tracks formed in a groove-like configuration.

Referring now to the drawings, there is shown in FIG. 1 a fragmentary perspective view of an optical recording and reproducing disc 1 to which the present invention may be applied. The optical recording and reproducing disc 1 includes a substrate 6, grooves each having a width W, a depth $\delta$ and a pitch P and formed on one surface R of the substrate 6 to constitute thereon guide tracks 2a, 2b, 2c, 2d and 2e in a concentric or spiral configuration which are separated from each other by flat portions 3a, 3b, 3c and 3d provided therebetween, and a layer of photosensitive recording material deposited on the surface R to form a recording layer 4 thereon. A very fine beam of spot light 5 is irradiated onto the disc 1, for example, from the side of the substrate 6 so as to be focused on the surface R for recording necessary information thereon. The information is recorded at the bottom portions of the grooves for the guide tracks 2a to 2e, and in the bottom of the groove for the outermost guide track 2a, dark and light pits are recorded to provide an evaluation track thereby. Normally, each of the tracks 2a to 2e provided at a pitch P in the range of 1.6 to 2 $\mu$m, has a width W=0.7 $\mu$m, while a groove depth $\delta$ thereof is selected to be in the range of approximately 1/5 to 1/8 wavelength for detecting a tracking signal by the very fine beam of the spot light 5.

Figure 2:
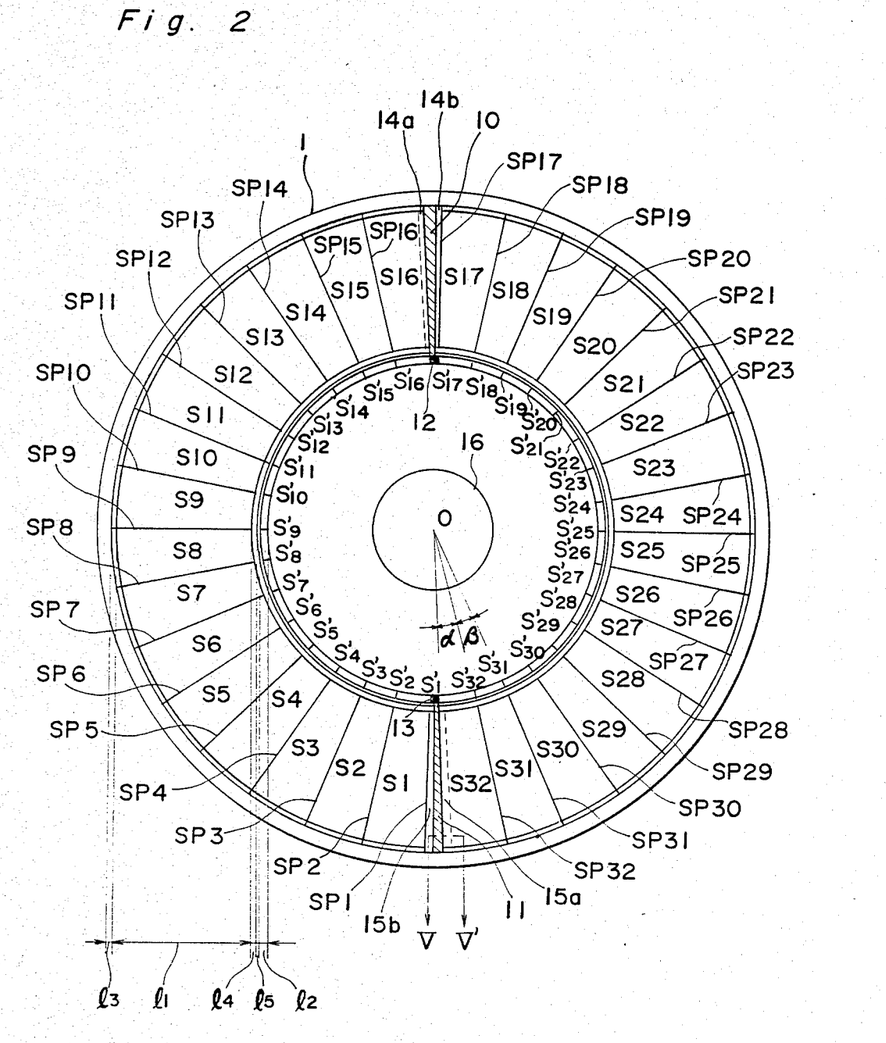
FIG. 2 is a diagram explanatory of the construction of an optical recording and reproducing disc according to one preferred embodiment of the present invention.

Referring also to a diagram of FIG. 2 showing the construction of the optical recording and reproducing disc with 32 sectors per one track according to one preferred embodiment of the present invention, the optical recording and reproducing disc 1 includes a data track section 11, an index track section 12, evaluation track sections 13 and 14, and a flat portion 15 which is formed with no guide tracks.

The track address information is recorded by a concave and convex phase structure in track address zones 10 and 11 through cutting in a relation of point symmetry with respect to a center O of said disc 1.

In the data track 11, the guide track is divided into 32 sectors S1, S2, S3, . . . , and S32 by sector separating zones Sp1, Sp2, Sp3, . . . , and Sp32. Angles $\alpha$ and $\beta$ respectively denote vertical angles for the sectors S16 and S32, and sectors S1 to S15 and S17 to S31, with the angle $\alpha$ being set to be larger than the angle $\beta$.

The index track 12 includes index marks 12 and 13 and sector marks S'1, S'2, S'3 . . . , and S'32. The index marks 12 and 13 are aligned with the track address zones 10 and 11, and the sector marks S'1 to S'32 are aligned with the sector separating zones Sp1 to Sp32 respectively on straight lines passing through the center O of the optical recording and reproduction disc 1.

In the data track 11 on the straight lines where the index marks 12 and 13 are located, the track address zones 10 and 11 referred to above are positioned, and the track address zone 10 is provided with dummy regions 14a and 14b at its front and rear portions, while the track address zone 11 is also provided with dummy regions 15a and 15b at its front and rear portions respectively as shown. The vertical angle α of the sectors S16 and S32 including the dummy regions 14a and 15a respectively is larger than the angle β of the sectors S1 to S15 and S17 to S31 without dummy regions by that extent. The dummy regions 14a and 15b are the regions to be employed when the so-called still function is effected through one track jumping of the spiral guide tracks as described later with reference to FIG. 3.

Additionally, the dummy regions 14a, 14b, 15a and 15b have functions to absorb deviations in the time differences of timing between index mark detection output and optical pick-up reading output. The time differences as described above take place due to eccentricity of the optical recording and reproducing disc, inaccuracy in mounting the detector, deviation in an optical axis between a disc motor spindle and the optical pick-up of an optical recording and reproducing apparatus, etc., thus resulting in a restriction to interchangeability.

The track address information recorded on the track address zones 10 and 11 are to be renewed at either one of the positions of the index marks 12 or 13, whereby, in the case of an optical recording and reproducing disc having a spiral guide track, the still function which subjects the spiral track to tracking as in concentric circular tracks may be facilitated.

Meanwhile, with respect to the track address reproduction of the track address zones 10 and 11, through gating of the reading output of an optical pick-up 17, to be described later with reference to FIG. 4, by an address extraction gate signal produced from the index marks 12 and 13, the influence due to faults and flaws of the optical recording and reproducing disc and information recorded in the sectors S1, S2, S3, . . . , and S32 may be reduced to a minimum, thus making it possible to effect the track address reproduction very stably.

Figure 3:
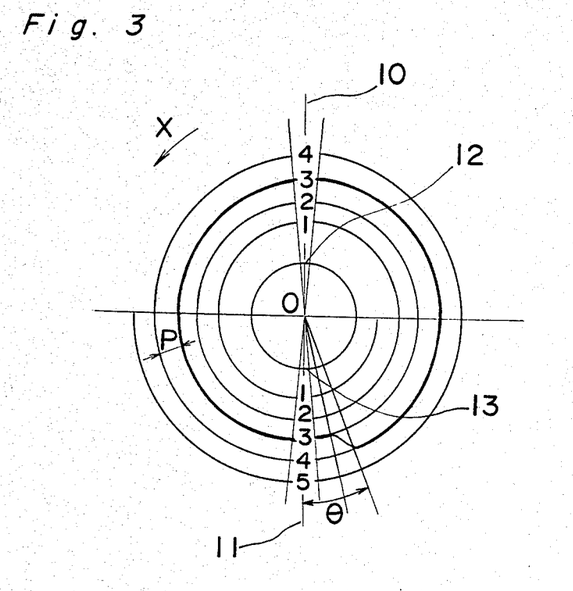
FIG. 3 is a schematic diagram explanatory of a still function of the optical recording and reproducing disc having a spiral guide track.

Reference is made to the diagram of FIG. 3 for explaining one track jumping during the still function of the optical recording and reproducing disc 1 having the spiral guide track as described above, and also, to the diagram of FIG. 4 illustrating the positional relation on the disc 1 between the optical pick-up 17 and index mark detector 18 for effecting the still function of FIG. 3. Both FIGS. 3 and 4 are based on the assumption that the optical recording and reproducing disc 1 as shown in FIG. 2 is employed, and therefore, detailed constructions of the disc 1 are abbreviated here for brevity.

Figure 4:
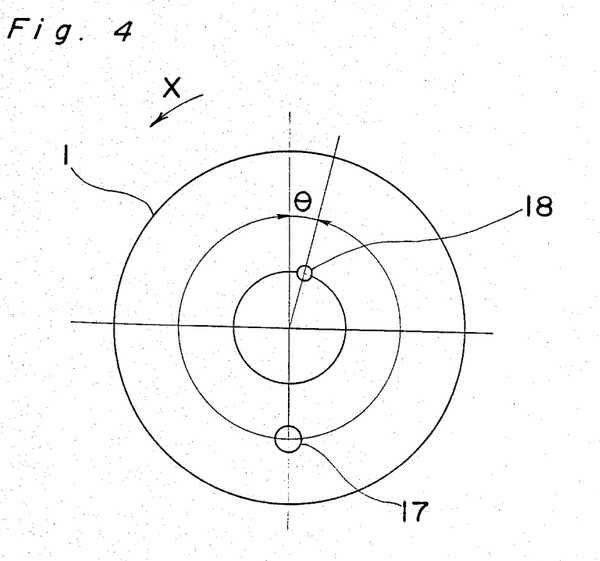
FIG. 4 is a schematic diagram explanatory of the positional relation between the optical recording and reproducing disc and an optical pick-up, and an index mark detector, FIGS. 5(a) and 5(b) respectively are a fragmentary top plan view and a sectional view of the optical recording and reproducing disc taken along a boundary line V–V' in FIG. 2, showing on an enlarged scale, the structure of a track address zone and a sector of said disc.

In FIG. 4, the optical pick-up 17 and the index mark detector 18 are disposed at opposite sides with respect to the center O of the disc 1 for facilitation of mounting thereof, and for providing proper start timing of the jumping explained with reference to FIG. 3, the index mark detector 18 is mounted at a position advanced by an angle θ with respect to a rotational direction x of the disc 1 from the line for a head of the optical pick-up 17.

FIG. 3 shows the still function for the track address No. 3, and when the index mark detector 18 has detected the index mark 12, the optical pick-up 17 is shifted towards the inner path by the track pitch P for deflection of the very fine beam of spot light, during which period, the optical pick-up 17 is passing through the sector S32 in FIG. 2. The track address information is subjected to cutting in the above case so as to be renewed at the index mark 13. Accordingly, since the optical pick-up 17 can read the address zone 11 immediately after completion of the jumping, it may be ensured that the jumping is accurately effected, thus making it possible to perform the still function at high reliability.

Meanwhile, the time difference or jitter in the output of the index mark detector 18 and the reading output of the optical pick-up 17 resulting from the mounting accuracy of the index mark detector 18, eccentricity of the disc 1, errors in centering between the center hole 16 of the disc 1 and the center for the guide track, and the deviation between the optical axis of the optical pick-up 17 and the center of the disc motor spindle, etc. may be absorbed by the dummy regions 14a, 14b, 15a and 15b as described earlier with reference to FIG. 2 for interchangeability between the optical recording and reproducing disc 1 and optical information recording and reproducing apparatus.

Figure 5:
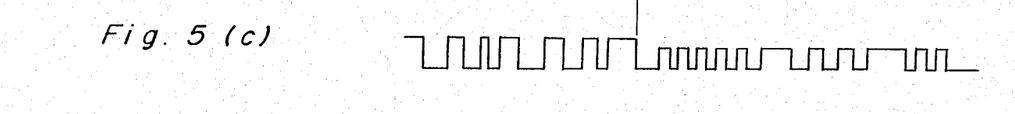

Reference is further made to FIGS. 5(a) and 5(b) illustrating, on an enlarged scale, a boundary portion V–V' (FIG. 2) representing the track address for one track recorded in the track address zone 11 for the data track section 11 in FIG. 2, in which FIG. 5(a) is a fragmentary top plan view of the guide track at the boundary portion V–V', and FIG. 5(b) is a cross section taken at said boundary portion. The track includes the track address zone 11 and a guide track 19 constituting the sector, and said guide track 19 is formed by the flat groove having the width W and depth δ uniform in the circumferential direction of the disc 1 in a manner similar to each of the guide tracks 2a to 2e in FIG. 1.

In the track address zone 11, the predetermined track address is represented by concave and convex phase grooves, which are cut at the same time as the guide track 19 during manufacture of a disc prototype for simultaneous duplication by a known stamper technique, with further deposition of a recording material thereon for the formation of the recording layer 4 (FIG. 1).

For recording information on the optical recording and reproducing disc 1, heat mode recording has been well known which may be effected by forming holes in the recording layer 4 or subjecting said layer 4 to variations in reflectance. The information or signal thus recorded is read out through intensity variation of reflected light with a light power at a level lower than a threshold value of sensitivity of the recording layer 4, and the waveform of the reproduction signal from the above is illustrated in FIG. 5(c).

Each of the sector separating zones Sp1 to Sp32 has a concave and convex phase construction of a predetermined configuration for indicating a starting end of the corresponding one of the sectors S1 to S32 in which information is recorded. Moreover, these sector separating zones Sp1 to Sp32 are respectively recorded on the straight lines passing through the center O of the optical recording and reproducing disc 1, with inner edges of said zones Sp1 to Sp32 being each aligned with the corresponding sector marks S'1 to S'32 of the index track section 12 as is most clearly seen in FIG. 2.

Referring also to the fragmentary top plan view and the sectional view of the optical recording and reproducing disc shown in FIGS. 6(a) and 6(b), and representing phase construction of a sector S and sector separating zone Sp of said disc, the sectors S may be represented by the guide tracks 19 having a groove depth δ, while the sector separating zones Sp include rows 20 of pits and guide track pieces 21 which are repeatedly formed in a plurality of pairs as shown. In the rows 20 of pits, pits are recorded at a pitch P which is set to be smaller than a track pitch Pt for the guide tracks. The guide track pieces 21 have the construction similar to the guide tracks 19, and are formed to be approximately equal in length to the rows 20 of the pits.

Figure 7A:
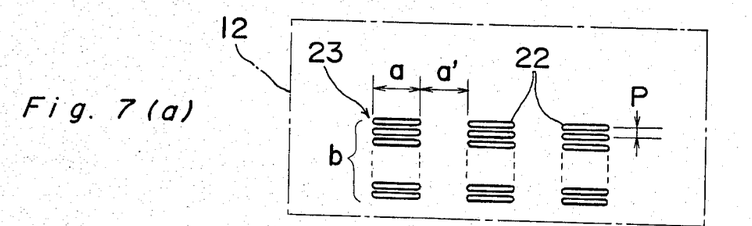
FIGS. 7(a), 7(b) and 7(c) are diagrams explanatory of index marks and sector marks in the index track of the optical recording and reproducing disc of FIG. 2.
Figure 7B:
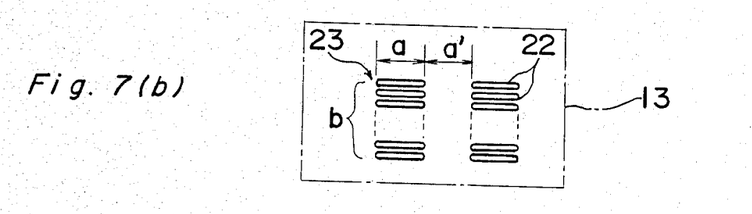
Figure 7C:
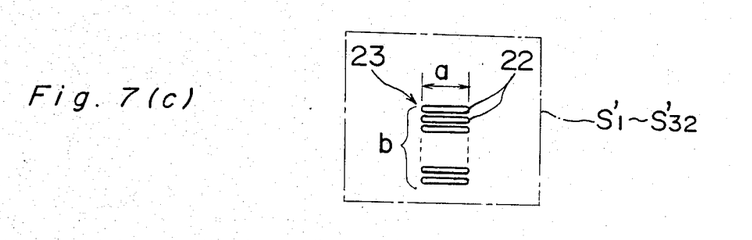

Reference is further made to FIGS. 7(a), 7(b) and 7(c) showing detailed constructions of the index track 12. In FIG. 7(a) illustrating the construction of the index mark 12, three groups 23 of guide track pieces, in each group of which the guide track pieces 22 having a length "a" are recorded for a width "b" at a pitch equal to that of the guide tracks, are arranged at an interval "a'". For subjecting the index track 12 to detection by the reflected light through employment of a light emitting diode and a photo diode (not shown) for the index mark detector 18, the length "a", interval "a'" and width "b" for the groups 23 of the guide track pieces 22 may be set in the range of approximately 0.2 to 1.0 mm. Similarly, the index mark 13 is constituted by two groups 23 of the guide track pieces 22 as shown in FIG. 7(b), while the sector marks S'1 to S'32 are each formed by one group 23 of the guide track pieces 22 as illustrated in FIG. 7(c).

As described above, by properly combining the groups 23 of the guide track pieces 22, it becomes possible to take out, through decoding, the information of the index marks 12 and 13 and sector marks S'1 to S'32 via the reflected light from the index track 12.

Since resolving power of the index mark detector 18 tends to be low if the light emitting diode and photodiode are employed, it is necessary to eliminate the influence of reflected light from portions other than the index track 12, and therefore, the flat portion 15 is provided between the index track 12 and the data track 11 (FIG. 2), whereby the index marks 12 and 13 and the sector marks S'1 to S'32 may be detected at a favorable S/N ratio.

The sector marks S'1 to S'32 are employed for timing control to turn on the tracking servo of the optical pick-up 17 for the improvement of oscillating phenomenon during energization of the tracking servo.

More specifically, in the case where the tracking servo is turned on immediately after the optical pick-up 17 has been transferred at a high speed to a desired track by a linear motor and the like (not shown) during retrieval of the optical recording and reproducing disc 1, if the optical pick-up 17 is located on the sector separating zones Sp1 to Sp32 or on the track address zones 10 and 11, light reflected therefrom is mixed into a tracking error signal to render the servo system unstable in some cases. For preventing the inconvenience as described above, it may be so arranged that, through detection by the sector marks S'1 to S'32, the optical pick-up 17 reads the sector separating zones Sp1 to Sp32 or track address zones 10 and 11 so that the tracking is started at regions other than said sector separating zones and track address zones, whereby occurrence of oscillation and unstability in the servo system is prevented.

It should be noted here that, in the foregoing embodiment, although the index track 12 has been described as provided in the innermost peripheral portion of the optical recording and reproducing disc 1, similar effects may be obtained even when the index track is located at the outermost peripheral portion of the disc 1, in which case, since the time difference or jitter due to eccentricity of the optical recording and reproducing disc 1 may be reduced to approximately ½ for improvement, the dummy regions may further be decreased.

Figure 6:
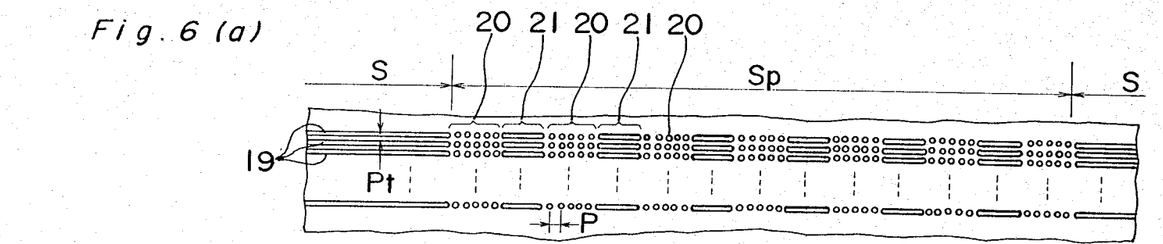
Figure 8:
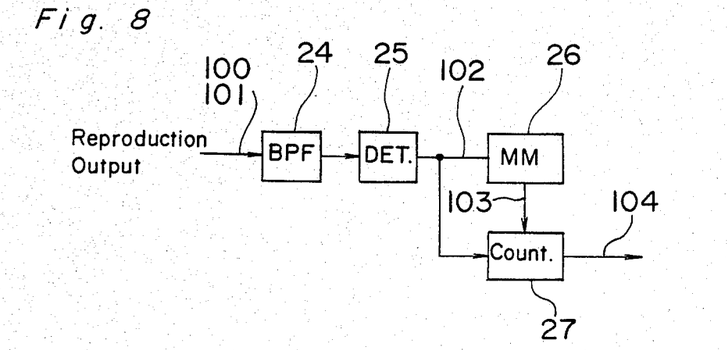
FIG. 8 is an electrical block diagram of a circuit for detecting the sectors by the sector separating zones in the optical recording and reproducing disc in FIG. 2, FIGS. 9(a) to 9(e) are diagrams showing waveforms at respective portions in the circuit of FIG. 8.
Figure 9A:
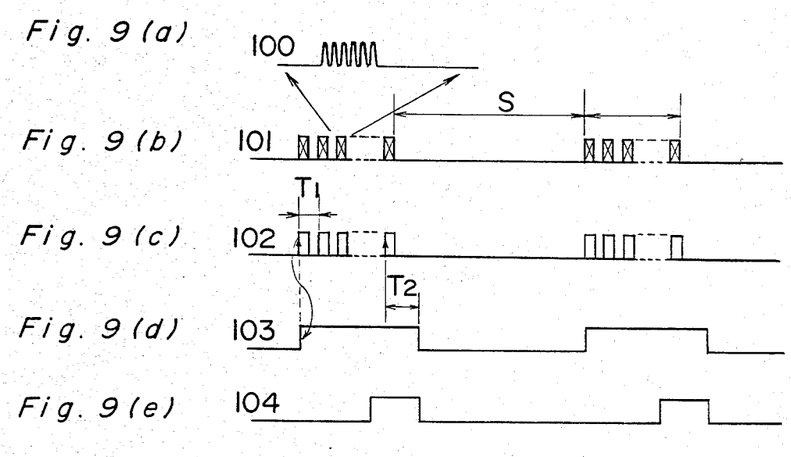

FIG. 8 shows an electrical block diagram of a circuit for detecting the sectors from the sector separating zones Sp in FIG. 6, while FIGS. 9(a) to 9(e) represent waveforms at respective portions in the circuit of FIG. 8, with FIG. 9(a) showing the waveform in FIG. 9(b) on an enlarged scale.

The circuit of FIG. 8 generally includes a band-pass filter 24 which receives the reproduction output from the optical pick-up 17 and is connected to a detection and shaping circuit 25, a mono-stable multi-vibrator 26 of re-trigger type coupled to the detection and shaping circuit 25, and a counter 27 connected to the circuit 25 and the mono-stable vibrator 26 as shown.

In the circuit of FIG. 8, the reproduction outputs from the optical pick-up 17 are produced in a burst form at a period of the pitch P for the pits of the pit rows 20 of the sector separating zones Sp as shown in FIGS. 9(a) and 9(b).

The reproduction outputs 100 and 101 in FIGS. 9(a) and 9(b) are extracted by the band-pass filter 24, and after being subjected to envelope detection at the detection and shaping circuit 25, formed into pulses. The detection output 102 from the circuit 25 as shown in FIG. 9(c) is formed into repeating pulses at period T1 of "1" for the pit rows 20, and of "0" for the guide track pieces 21. The mono-stable multi-vibrator 26 of re-trigger type produces pulses 103 with a pulse width T2 upon rising of the detection output 102 in FIG. 9(c). The pulse width T2 is set in such a manner that the relation T1<T2 may be established. The output 103 of the mono-stable multivibrator 26 as shown in FIG. 9(d) is applied to a clear terminal of the counter 27 so as to count falling of the detection output 102 in FIG. 9(c), and when the count value has reached the predetermined pulse number, the counter 27 produces the sector detection output 104 as illustrated in FIG. 9(e), with the output being interrupted upon falling of the output of the mono-stable multi-vibrator 26.

As is seen from the foregoing description of the sector detection, since the sector separating zones Sp may be detected by counting the number of pit rows 20, correct detection may be effected even when the optical recording and reproducing disc 1 has flaws and faults with a length on the order of about several times that of the pit rows 20. Moreover, in the case where information has been recorded in the sectors S, since detection is not effected unless a frequency component similar to that of the pit row 20 with the repeating period T1 as in the detection output 102 in FIG. 9(c) is contained by more than several pulses, correct functioning may be achieved. It is to be noted here that, since the sector detection output 104 as shown in the above FIG. 9(e) is a signal indicating the leading one of the sectors S, in order to find the equivalent sector number, it is necessary to provide a counter for counting the sector detection output 104 of FIG. 9(e) as clock pulses and a rotation starting end detecting means for the optical recording and reproducing disc 1 which judges the first sector position. The rotation starting end detection as described above may be effected by the index marks 12 and 13 as described with reference to FIG. 2.

Figure 10:
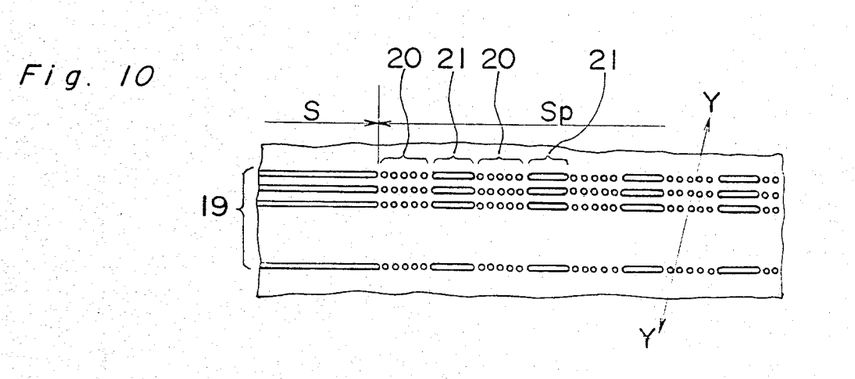
FIG. 10 is a schematic diagram showing the state in which the optical pick-up travels over the optical recording and reproducing disc.

Furthermore, since the sector separating zone Sp is constituted by the rows 20 of the concave and convex pits having the pitch P sufficiently small as compared with the track pitch Pt and the guide track pieces 21 as shown in FIGS. 6(a) and 6(b), even in the case where the beam of the spot light of the optical head 17 crosses over the pit rows 20 during retrieval of the data track as represented by a line Y–Y' in FIG. 10, at least one pit is present within the beam of the spot light for making it possible to detect such crossing.

As is clear from the foregoing description, the optical recording and reproducing disc having the guide tracks for optical recording and reproduction of information according to the present invention includes the track address zones provided at specific positions in the circumferential direction of the data track, the plurality of sectors provided in remaining portions in the circumferential direction of the data track by dividing said data track through sector separating zones, the index track located at the inner or outer side of said data track, index marks provided on the index track at positions corresponding to said track address zones, and the plurality of sector marks respectively provided also on the index track in positions corresponding to starting ends of said sectors, and therefore, it becomes possible to effect stable address reproduction, and tracking servo actuation without being affected by the presence of the sector recorded information and sector separating zones.

Furthermore, since the optical recording and reproducing disc according to the present invention is provided with the sector separating zones having the phase construction in which the pit rows having the pit interval smaller than the track interval of the guide tracks, and the guide track pieces having the length approximately equal to the length of the pit rows are repeatedly formed, the functioning thereof is not readily affected by the flaws and faults of said disc for accurate detection of the sector positions, while in the case where the optical pick-up retrieves the desired track by finding the moving distance of the optical pick-up by the number of crossed guide tracks, correct retrieval is possible, with the eccentricity of said disc advantageously compensated.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. An optical recording and reproducing disc for optically recording and reproducing information, and comprising:
    a data track section including groove-like guide tracks;
    said groove-like guide tracks being divided by sector separating zones into track address zones formed by groove-like pits and a plurality of information recording sectors;
    said sector separating zones being constituted by repetition of concave and convex pit portions formed by a large number of approximately circular pits and elongated uniform pits of approximately the same length;
    an index track section formed at an outer side or an inner side of said data track section;
    said index track portion having index marks at positions corresponding to said track address zones, and sector marks at positions corresponding to said sector separating zones;
    said sector marks being formed by elongated arcuate uniform pits so as to be concentrically positioned with respect to said groove-like guide tracks; and
    said index marks being formed by using at least two of said sector marks.

2. A disc as claimed in claim 1, comprising first and second said track address zones, and said index marks comprise a first index mark formed by three said sector marks and positioned adjacent said first track address zone and a second index mark formed by two said sector marks and positioned adjacent said second track address zone.

3. A disc as claimed in claim 1, further comprising a flat portion provided between said data track section and said index track section.

4. A disc as claimed in claim 1, wherein said guide tracks of said data track section are formed into a spiral configuration, and one of said sectors neighboring said each said track address zone is longer than the remainder of said sectors.

* * * * *